(12) United States Patent
Oshiba

(10) Patent No.: US 9,521,054 B2
(45) Date of Patent: Dec. 13, 2016

(54) AVAILABLE BANDWIDTH SEARCH RANGE CONTROL METHOD AND AVAILABLE BANDWIDTH SEARCH RANGE CONTROL SYSTEM

(71) Applicant: NEC CORPORATION, Tokyo (JP)

(72) Inventor: Takashi Oshiba, Tokyo (JP)

(73) Assignee: NEC Corporation, Tokyo (JP)

(*) Notice: Subject to any disclaimer, the term of this patent is extended or adjusted under 35 U.S.C. 154(b) by 213 days.

(21) Appl. No.: 14/374,108

(22) PCT Filed: Dec. 14, 2012

(86) PCT No.: PCT/JP2012/008008
§ 371 (c)(1),
(2) Date: Jul. 23, 2014

(87) PCT Pub. No.: WO2013/111236
PCT Pub. Date: Aug. 1, 2013

(65) Prior Publication Data
US 2015/0036534 A1 Feb. 5, 2015

(30) Foreign Application Priority Data
Jan. 25, 2012 (JP) .................................. 2012-013200

(51) Int. Cl.
*H04L 12/26* (2006.01)
*H04L 25/02* (2006.01)
*H04L 29/06* (2006.01)

(52) U.S. Cl.
CPC ....... *H04L 43/0805* (2013.01); *H04L 25/0262* (2013.01); *H04L 43/062* (2013.01); *H04L 43/12* (2013.01); *H04L 69/24* (2013.01)

(58) Field of Classification Search
CPC .......... H04L 3/0805; H04L 3/062; H04L 3/12; H04L 25/0262; H04L 69/24
(Continued)

(56) References Cited

U.S. PATENT DOCUMENTS 6,611,537 B1 * 8/2003 Edens ................. H04L 12/2803
348/E7.05
8,036,137 B2 * 10/2011 Bossler ............. H04W 56/0065
370/252
(Continued)

FOREIGN PATENT DOCUMENTS

EP 1455490 A2 9/2004
JP 2004-266840 A 9/2004
(Continued)

OTHER PUBLICATIONS

Bacioccola et al, "Bandwidth Allocation with Half-Duplex Stations in IEEE 802.16 Wireless Networks"; vol. 6, Issue: 12; pp. 1384-1397; Dec. 2007.*

(Continued)

*Primary Examiner* — Thai Hoang
(74) *Attorney, Agent, or Firm* — Wilmer Cutler Pickering Hale and Dorr LLP

(57) ABSTRACT

A first terminal 1000 includes: a local terminal transmission rate acquisition unit 100 for acquiring a transmission rate of an application in the first terminal 1000; a search range control unit 110 for deciding an upper limit of a search range of an available bandwidth of a communication line, using the transmission rate; and a probe packet transmission unit 120 for transmitting a probe packet to a second terminal 2000 in a bandwidth less than or equal to the upper limit. The second terminal 2000 includes: a probe packet receiving unit 200 for receiving the probe packet; and an available bandwidth estimation unit 210 for estimating the available bandwidth based on the received probe packet.

2 Claims, 9 Drawing Sheets

(58) Field of Classification Search
USPC .................................. 370/231–236, 252–253
See application file for complete search history.

(56) References Cited

U.S. PATENT DOCUMENTS

| | | | |
|---|---|---|---|
| 2003/0108050 A1* | 6/2003 | Black | H04L 49/357 |
| | | | 370/395.51 |
| 2004/0174815 A1 | 9/2004 | Khisti et al. | |
| 2008/0144499 A1* | 6/2008 | Adhikari | H04L 47/10 |
| | | | 370/232 |

FOREIGN PATENT DOCUMENTS

| | | |
|---|---|---|
| JP | 4153510 B2 | 7/2008 |
| JP | 2011-142622 A | 7/2011 |

OTHER PUBLICATIONS

Ribeiro et al., "pathChirp: Efficient Available Bandwidth Estimation for Network Paths," Department of Electrical and Computer Engineering, Rice University, SLAC/SCS-Network Monitoring, Stanford University, Apr. 2003, pp. 1-11.

Le Thanh Man, Cao, "A Study on Inline Network Measurement Mechanism for Service Overlay Networks," IEICE Technical Report, vol. 102, No. 565, Jan. 10, 2003, pp. 53-58.

International Search Report corresponding to PCT/JP2012/008008, Feb. 12, 2013, 1 page.

* cited by examiner (A)

(B)

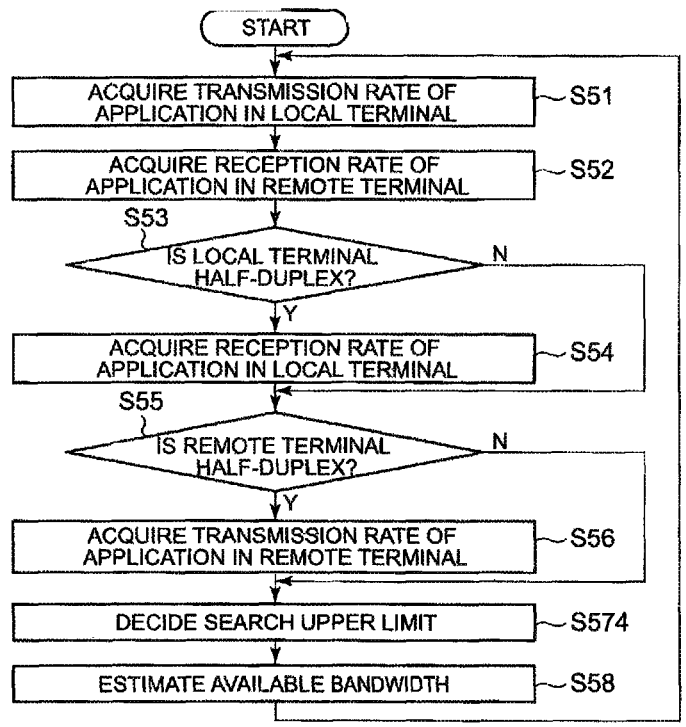
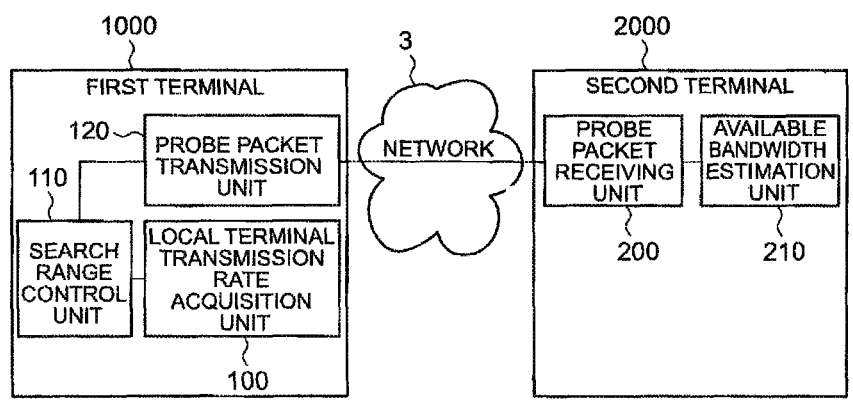

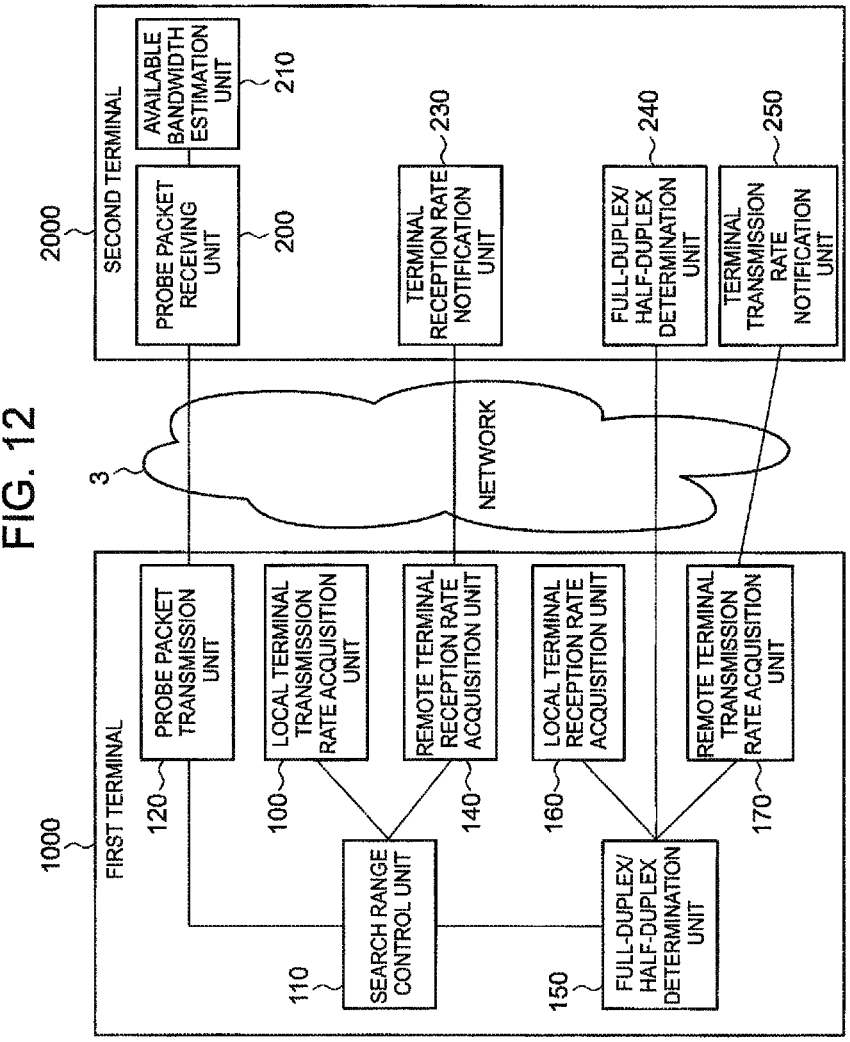

AVAILABLE BANDWIDTH SEARCH RANGE CONTROL METHOD AND AVAILABLE BANDWIDTH SEARCH RANGE CONTROL SYSTEM

CROSS-REFERENCE TO RELATED APPLICATIONS

The present application is a national stage application of International Application No. PCT/JP2012/008008 entitled "Available Bandwidth Search Range Control Method and Available Bandwidth Search Range Control System," filed on Dec. 14, 2012, which claims the benefit of priority from Japanese Patent Application No. 2012-013200, filed on Jan. 25, 2012, the disclosures of which are incorporated herein in their entirety by reference thereto.

TECHNICAL FIELD

The present invention relates to a method of estimating an available bandwidth which is an unused bandwidth of a communication line, and especially relates to a method of controlling a range in which an available bandwidth is searched for.

BACKGROUND ART

An available bandwidth (also called "usable bandwidth") of a communication line is an unused bandwidth obtained by subtracting other traffic (hereafter referred to as "cross traffic") flowing in a network from a physical bandwidth of a bottleneck link in the communication line. For example, in the case where the physical bandwidth of the bottleneck link in the communication line is 100 Mbps and the cross traffic is 30 Mbps, the available bandwidth is 100−30=70 Mbps.

Estimating the current available bandwidth is important in video chat, video calling, video conferencing, and the like where communication is performed by two-way transmission of video between terminals. By limiting a transmission rate of video to not greater than the estimate of the available bandwidth, it is possible to keep the sum of the transmission rate of video and the cross traffic from exceeding the physical bandwidth of the bottleneck link in the communication line. This prevents packet loss, thus ensuring video quality.

Non Patent Literature (NPL) 1 proposes a method in which a transmitter terminal transmits a plurality of probe packets of a fixed size to a receiver terminal as one set (hereafter referred to as "packet train"), and the receiver terminal detects a change in reception interval of probe packets to estimate an available bandwidth. This method has a feature that, when the transmitter terminal transmits the packet train, the probe packets are transmitted at exponentially decreasing transmission intervals. Accordingly, in this method, a transmission rate of probe packets increases exponentially in the packet train.

In the case where the transmission rate of probe packets exceeds the available bandwidth of the network when the packet train travels through the network, probe packets are temporarily queued in a device such as a router or a switch in the network. This causes an increase in reception interval of probe packets in the receiver terminal relative to the transmission interval in the transmitter terminal. The available bandwidth is computed based on this property. In detail, the receiver terminal detects a point at which the reception interval of probe packets starts to increase relative to the transmission interval in the transmitter terminal, and divides the packet size of the probe packet by the transmission interval at the point, to compute the available bandwidth.

Patent Literature (PTL) 1 proposes a method in which a transmitter terminal transmits a plurality of probe packets of gradually increasing packet sizes to a receiver terminal as a packet train, and the receiver terminal detects a change in reception interval of probe packets to estimate an available bandwidth. This method has a feature that, when the transmitter terminal transmits the packet train, the probe packets are transmitted at regular transmission intervals. In this method, a transmission rate of probe packets increases linearly in the packet train. The receiver terminal computes the available bandwidth in the same way as the computation method proposed in NPL 1.

PTL 2 proposes a method in which a transmitter terminal repeatedly performs an operation of transmitting a packet train made up of a sequence of probe packets of a fixed size at regular transmission intervals to a receiver terminal a plurality of times, to estimate an available bandwidth. In this method, the available bandwidth is estimated through binary search by repeatedly performing the following operation: the transmitter terminal transmits the packet train at exponentially decreasing transmission intervals to the receiver terminal in the case where the reception interval tends to increase in the receiver terminal, and transmits the packet train at exponentially increasing transmission intervals to the receiver terminal in the case where the reception interval tends to decrease in the receiver terminal.

CITATION LIST

Patent Literatures

PTL 1: Japanese Patent Application Laid-Open No. 2011-142622

PTL 2: Japanese Patent No. 4153510

Non Patent Literature

NPL 1: Vinay Ribeiro, Rudolf Riedi, Richard Baraniuk, Jiri Navratil and Les Cottrell "pathChirp: Efficient Available Bandwidth Estimation for Network Paths," in Proc of Passive and Active Measurement Workshop 2003, April 2003

SUMMARY OF INVENTION

Technical Problem

In the case where an application for video communication or the like has a high transmission rate, an available bandwidth is narrowed due to the traffic of the application itself rather than the cross traffic. A typical available bandwidth estimation method has a problem that, despite the above-mentioned lowering of an upper limit of an available bandwidth to be searched for, an available bandwidth in an unnecessarily wide range is searched for. This is because the typical available bandwidth estimation method mainly focuses on checking how much cross traffic there is before an application in a local terminal starts communication, and fails to take into account the application in combination with available bandwidth estimation.

For example, in NPL 1, available bandwidth estimation is intended for a purpose of selecting a communication path or a server from a plurality of candidates. First, a communication path or a server with which a wide bandwidth can be used is specified by available bandwidth estimation. After the estimation process, the communication path or the server is used. In the method described in NPL 1, in the case where, as a result of transmitting the packet train a plurality of times, the estimate is continuously the upper limit or lower limit of the current available bandwidth search range, it is determined that the communication rate of cross traffic is too low or too high relative to the current available bandwidth search range. Then, upon the next transmission of the packet train, the transmission interval of probe packets is adjusted to downwardly modify or upwardly modify the available bandwidth search range. However, in NPL 1, though whether the communication rate of cross traffic is high or low is taken into account, whether the transmission rate of the application in the local terminal is high or low is not taken into account.

In the methods described in PTL 1 and PTL 2, bandwidth estimation is performed according to a fixed available bandwidth search range designated by a user in the system, so that the available bandwidth search range is not automatically changed.

The present invention has an object of preventing searching for an available bandwidth in an unnecessarily wide range in the case where an application for video communication or the like with a high transmission rate is used.

Solution to Problem

An available bandwidth search range control method according to the present invention includes: acquiring a transmission rate of an application in a local terminal; deciding an upper limit of a search range of an available bandwidth of a communication line, using the transmission rate; and estimating the available bandwidth in the search range less than or equal to the upper limit.

An available bandwidth search range control system according to the present invention includes a local terminal and a remote terminal that are connected to a network, wherein the local terminal includes: a local terminal transmission rate acquisition unit which acquires a transmission rate of an application in the local terminal; a search range control unit which decides an upper limit of a search range of an available bandwidth of a communication line, using the transmission rate; and a probe packet transmission unit which transmits a probe packet to the remote terminal in a bandwidth less than or equal to the upper limit, and wherein the remote terminal includes: a probe packet receiving unit which receives the probe packet; and an available bandwidth estimation unit which estimates the available bandwidth based on the received probe packet.

Advantageous Effects of Invention

According to the present invention, searching for an available bandwidth in an unnecessarily wide range can be prevented in the case where an application for video communication or the like with a high transmission rate is used. Since the search range of the available bandwidth can be controlled according to the transmission rate of the application for video communication or the like, an improvement in available bandwidth estimation accuracy and a reduction in communication load required for estimation are achieved.

BRIEF DESCRIPTION OF DRAWINGS

FIG. 10 It is a flowchart depicting an operation in Exemplary Embodiment 4.

FIG. 11 It is a block diagram depicting a main part of an available bandwidth search range control system.

FIG. 12 It is a block diagram depicting another example of the available bandwidth search range control system.

DESCRIPTION OF EMBODIMENTS

The following describes exemplary embodiments of the present invention with reference to drawings.

Exemplary Embodiment 1

Figure 1:
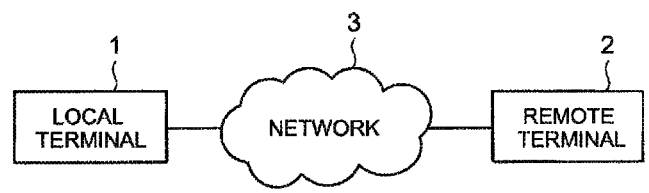
FIG. 1 It is a block diagram depicting an example of a system to which exemplary embodiments of the present invention are applied.

FIG. 1 is a block diagram depicting an example of a system to which exemplary embodiments of the present invention are applied. In the system depicted in FIG. 1, a local terminal 1 and a remote terminal 2 are connected to a network 3.

In this exemplary embodiment, it is assumed that an application for video communication such as video chat, video calling, or video conferencing is running in the local terminal 1 and the remote terminal 2. The case where the local terminal 1 and the remote terminal 2 estimate an available bandwidth in order to control a transmission rate of video according to an available bandwidth estimation result is described as an example below.

In the following description, "local terminal" always denotes a terminal with reference sign "1", and "remote terminal" always denotes a terminal with reference sign "2".

The local terminal 1 and the remote terminal 2 are each a device having a function of exchanging information with outside, such as a personal computer (PC), a mobile computer (PDA), a mobile phone, a smartphone, a landline phone, a street multimedia terminal, an in-car terminal, a network connectable television, a network connectable set-top box, a game machine, a network connectable printer, a network connectable scanner, etc. The local terminal 1 and the remote terminal 2 may each be a device other than the above-mentioned devices, so long as it has a function of exchanging information with outside.

Devices (not depicted) other than the local terminal 1 and the remote terminal 2 may be connected to the network 3. Cross traffic may flow between these devices (not depicted).

Figure 2:
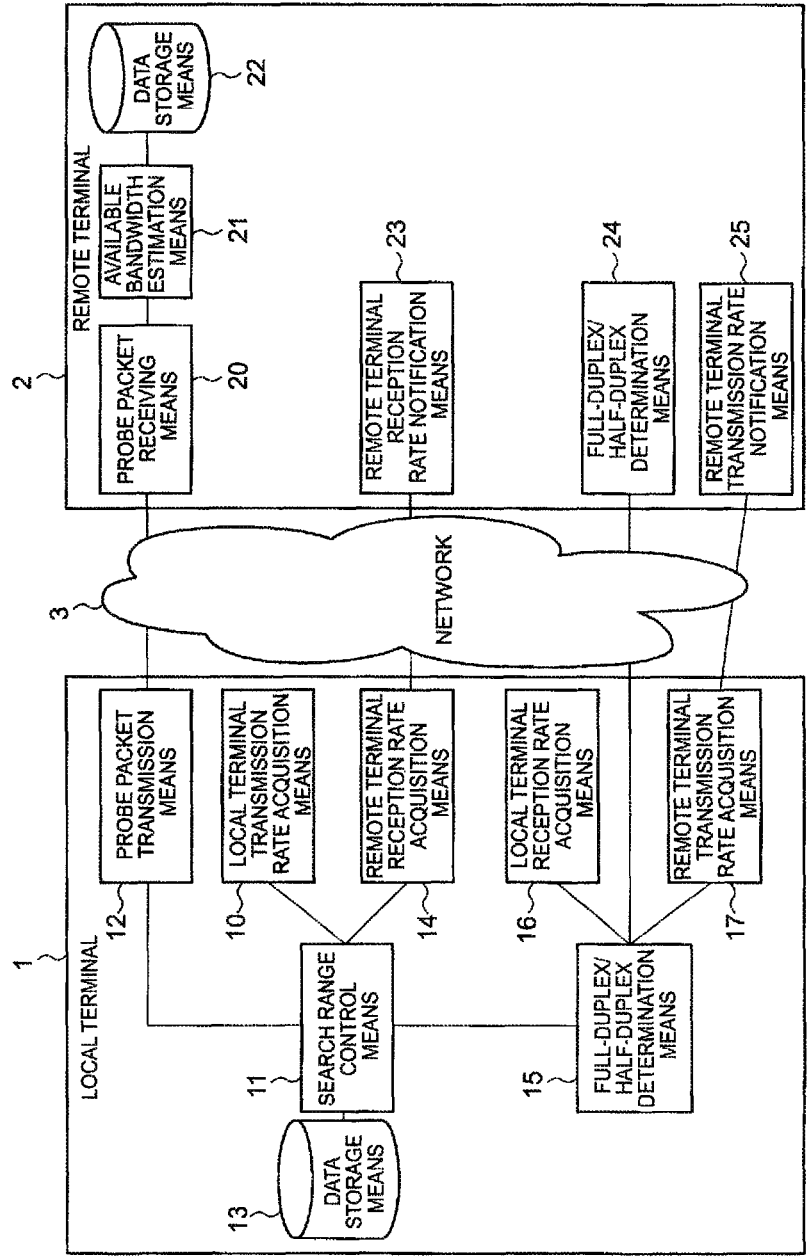
FIG. 2 It is a block diagram depicting an example of structures of a local terminal and a remote terminal.
Figure 3:
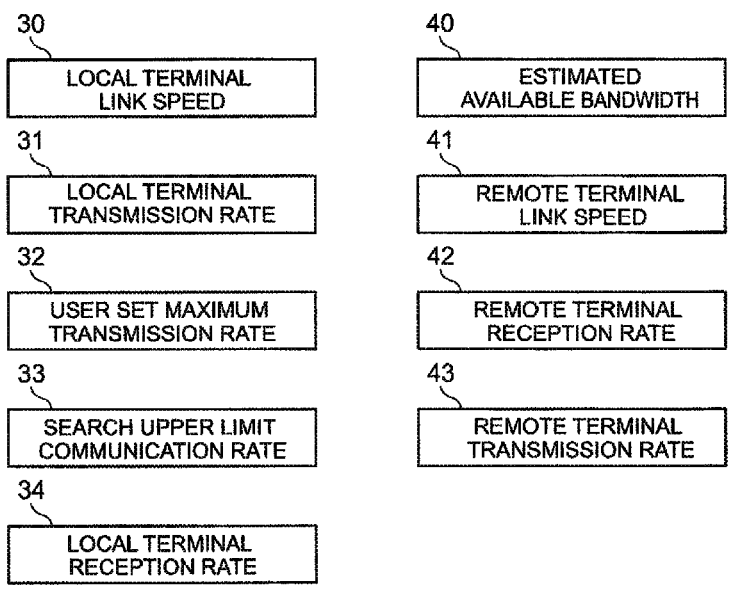
FIG. 3 It is an explanatory diagram depicting a data structure.

FIG. 2 is a block diagram depicting an example of structures of the local terminal 1 and the remote terminal 2. FIG. 3 is an explanatory diagram depicting a data structure.

The local terminal 1 includes local terminal transmission rate acquisition means 10, search range control means 11, probe packet transmission means 12, data storage means 13, remote terminal reception rate acquisition means 14, full-duplex/half-duplex determination means 15, local terminal reception rate acquisition means 16, and remote terminal transmission rate acquisition means 17.

The local terminal transmission rate acquisition means 10 acquires a communication rate of data being transmitted by an application in the local terminal 1 through a network interface (e.g. a network card). The application may include not only an application for performing control according to an available bandwidth estimation result for video communication or the like where video is transmitted between the local terminal 1 and the remote terminal 2, but also an application for mail transfer, file transfer, or the like. In such a case, the local terminal transmission rate acquisition means 10 acquires a sum of transmission rates of all applications transmitting data to the network through the network interface.

A destination of data of the application for mail transfer or file transfer need not be the remote terminal 2. In other words, a communication path of data of mail transfer or file transfer only partially overlaps with a communication path of data of video communication. In such a case, there is a possibility that data of mail transfer or file transfer travels through another communication path toward a destination other than the remote terminal 2 before passing through a bottleneck link between the local terminal 1 and the remote terminal 2, or passes through the bottleneck link and then travels through another communication path toward a destination other than the remote terminal 2.

The search range control means 11 decides an upper limit of a search range of an available bandwidth. The probe packet transmission means 12 transmits a packet train.

The data storage means 13 stores a local terminal link speed 30, a local terminal transmission rate 31, a user set maximum transmission rate 32, a search upper limit communication rate 33, and a local terminal reception rate 34.

In FIG. 3, the local terminal link speed 30 is a link speed of the network interface of the local terminal 1. For example, in the case where the terminal is connected to the network by a wired LAN (Local Area Network), the link speed is 100 Mbps, 1 Gbps, or the like. In the case where the terminal is connected to the network by a wireless LAN of IEEE 802.11, the link speed is 11 Mbps, 54 Mbps, or the like.

The local terminal transmission rate 31 is the communication rate of data being transmitted by the application in the local terminal 1 through the network interface.

The user set maximum transmission rate 32 is a value set by a user. In the case where a maximum transmission rate of video is predetermined as, for example, 10 Mbps in video communication or the like, the user set maximum transmission rate 32 takes the value of the maximum transmission rate. For instance, the maximum transmission rate of video is predetermined when the user decides that no higher video quality is necessary or when the processing performance of the terminal is insufficient if the transmission rate increases more.

The search upper limit communication rate 33 is the upper limit of the search range of the available bandwidth decided by the search range control means 11.

The local terminal reception rate 34 is a communication rate of data being received by the application in the local terminal 1 from the network interface.

The remote terminal reception rate acquisition means 14 acquires a remote terminal reception rate 42 from remote terminal reception rate notification means 23.

The full-duplex/half-duplex determination means 15 determines whether communication in a section of an access line of the local terminal 1, i.e. communication in a section up to one hop from the terminal, is full-duplex communication or half-duplex communication. Examples of full-duplex communication include communication by a wired LAN connected to a switching hub. Examples of half-duplex communication include communication in wireless connection by a wireless LAN and communication by a wired LAN connected to a repeater hub. The full-duplex/half-duplex determination means 15 determines whether the communication is full-duplex communication or half-duplex communication by determining, for example, the type of the connected device or the type of the access line.

The local terminal reception rate acquisition means 16 acquires the communication rate of data being received by the application in the local terminal 1 from the network interface. The application may include not only an application for performing control according to an available bandwidth estimation result for video communication or the like where video is transmitted between the local terminal 1 and the remote terminal 2, but also an application for mail transfer, file transfer, or the like.

The remote terminal transmission rate acquisition means 17 acquires a remote terminal transmission rate 43 from remote terminal transmission rate notification means 25.

The remote terminal 2 includes probe packet receiving means 20, available bandwidth estimation means 21, data storage means 22, the remote terminal reception rate notification means 23, full-duplex/half-duplex determination means 24, and the remote terminal transmission rate notification means 25.

The probe packet receiving means 20 receives the packet train.

The available bandwidth estimation means 21 estimates the available bandwidth by analyzing the received packet train. As a concrete estimation method, the method described in PTL 1 is available as an example.

For instance, the following method may be used as the available bandwidth estimation method described in PTL 1. The local terminal 1 transmits a plurality of probe packets of sequentially increasing or decreasing packet sizes, at regular transmission intervals. The remote terminal 2 computes the available bandwidth, using a probe packet whose packet size is largest of probe packets for which the reception interval and the transmission interval are equal. In detail, the remote terminal 2 estimates the available bandwidth as "(the available bandwidth)=(the packet size of the largest probe packet)/(the transmission interval)". Note that this estimation method is merely an example, and other available bandwidth estimation methods may be used.

The data storage means 22 stores an estimated available bandwidth 40, a remote terminal link speed 41, the remote terminal reception rate 42, and the remote terminal transmission rate 43.

The estimated available bandwidth 40 is the estimate of the available bandwidth computed by the available bandwidth estimation means 21. The remote terminal link speed 41 is a link speed of a network interface of the remote terminal 2. The remote terminal reception rate 42 is a communication rate of data being received by an application in the remote terminal 2 from the network interface. The remote terminal transmission rate 43 is a communication rate of data being transmitted by the application in the remote terminal 2 from the network interface.

The remote terminal reception rate notification means 23 notifies the remote terminal reception rate acquisition means 14 of the remote terminal reception rate 42.

The full-duplex/half-duplex determination means 24 determines whether communication in a section of an access line of the remote terminal 2 is full-duplex communication or half-duplex communication. The full-duplex/half-duplex determination means 24 notifies the local terminal 1 (for example, the full-duplex/half-duplex determination means 15) of the determination result.

The remote terminal transmission rate notification means 25 notifies the remote terminal transmission rate acquisition means 17 of the remote terminal transmission rate 43.

Figure 4:
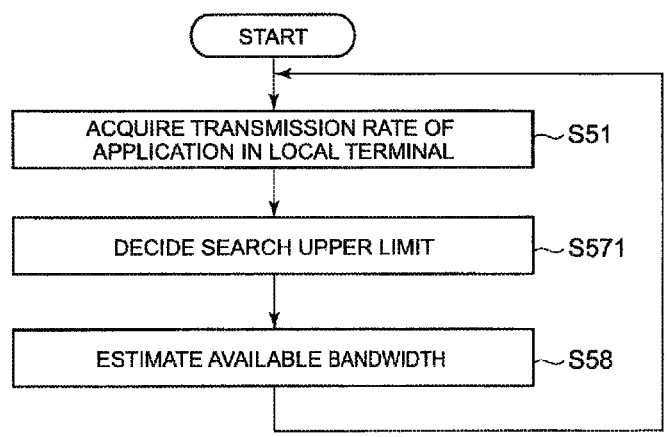
FIG. 4 It is a flowchart depicting an operation in Exemplary Embodiment 1.

The following describes an operation in this exemplary embodiment with reference to a flowchart in FIG. 4.

The local terminal transmission rate acquisition means 10 acquires the communication rate of data being transmitted by the application in the local terminal 1 through the network interface (step S51). The local terminal transmission rate acquisition means 10 stores the acquired communication rate in the data storage means 13 as the local terminal transmission rate 31.

Following this, in the case where the upper limit of the search range of the available bandwidth is not designated by the user and the user set maximum transmission rate 32 is null, the search range control means 11 computes "(the local terminal link speed 30)–(the local terminal transmission rate 31)", and sets the computation result as the upper limit of the search range of the available bandwidth (step S571). The search range control means 11 stores the upper limit in the data storage means 13 as the search upper limit communication rate 33.

Figure 5:
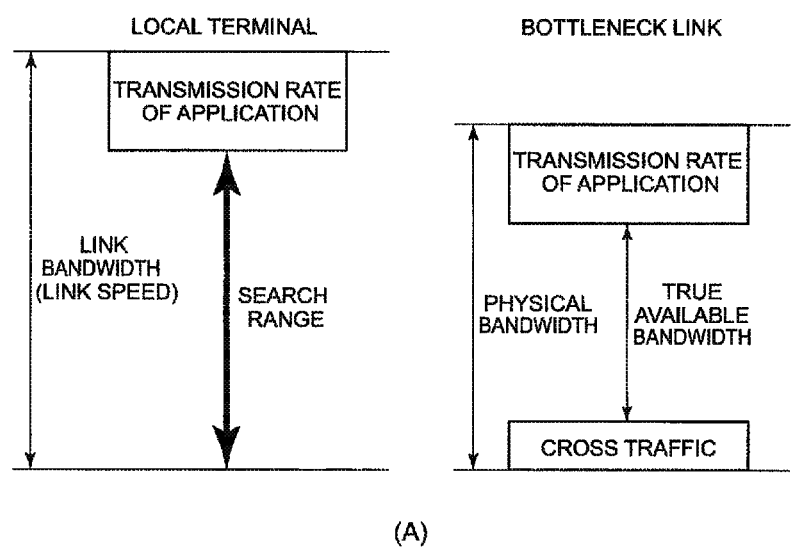
FIG. 5 It is an explanatory diagram depicting a search range computation method.
Figure 5:
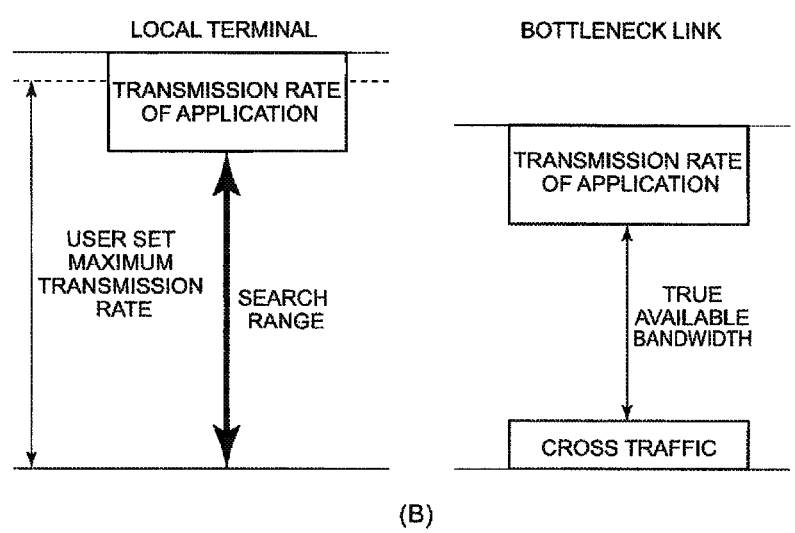

FIG. 5 is an explanatory diagram depicting a method of computing the search upper limit communication rate 33 (search range). A method of computing the search upper limit communication rate 33 (search range) in the case where the upper limit of the search range of the available bandwidth is not designated and the user set maximum transmission rate 32 is null is depicted in (A) in FIG. 5. In the typical available bandwidth estimation method, the search range matches the link bandwidth. In this exemplary embodiment, on the other hand, the range obtained by subtracting the transmission rate of the application from the link bandwidth is the search range. This search range is narrower than the search range in the typical available bandwidth estimation method.

In this exemplary embodiment, in the bottleneck link, the true available bandwidth obtained by subtracting the cross traffic and the transmission rate of the application in the local terminal 1 from the physical bandwidth of the bottleneck link is included in the search range. Therefore, in this exemplary embodiment, the available bandwidth is correctly estimated while preventing searching for an available bandwidth in an unnecessarily wide range.

In the case where the upper limit of the search range of the available bandwidth is designated by the user, i.e. in the case where a value is set in the user set maximum transmission rate 32, the search range control means 11 compares "(the user set maximum transmission rate 32)+(the local terminal transmission rate 31)" with "the local terminal link speed 30".

In the case where "(the user set maximum transmission rate 32)+(the local terminal transmission rate 31)>(the local terminal link speed 30)", the search range control means 11 computes "(the local terminal link speed 30)–(the local terminal transmission rate 31)", and sets the computation result as the upper limit of the search range of the available bandwidth. The search range control means 11 stores the upper limit in the data storage means 13 as the search upper limit communication rate 33.

A method of computing the search upper limit communication rate 33 (search range) in the case where a value is set in the user set maximum transmission rate 32 is depicted in (B) in FIG. 5. In this case, too, the available bandwidth is correctly estimated while preventing searching for an available bandwidth in an unnecessarily wide range, as in the case of executing the computation method depicted in (A) in FIG. 5.

In the case where "(the user set maximum transmission rate 32)+(the local terminal transmission rate 31)≤(the local terminal link speed 30)", the search range control means 11 sets the value of the user set maximum transmission rate 32 as the upper limit of the search range of the available bandwidth. The search range control means 11 stores the upper limit in the data storage means 13 as the search upper limit communication rate 33.

Next, the probe packet transmission means 12 forms the packet train so that the upper limit of the search range of the available bandwidth is the value of the search upper limit communication rate 33. The probe packet transmission means 12 then transmits the packet train to the probe packet receiving means 20. The available bandwidth estimation means 21 estimates the available bandwidth (step S58). The available bandwidth estimation means 21 stores the estimated available bandwidth in the data storage means 22 as the estimated available bandwidth 40. For example, the method described in PTL 1 may be used as a packet train formation method, a packet train reception method, and an available bandwidth estimation method in the available bandwidth estimation means 21. The operation then returns to step S51.

In this exemplary embodiment, for example when using the technique described in PTL 1 while repeatedly executing the processes of steps S51, S571, and S58, in the case where the upper limit of the search range becomes low, the amount of increase in packet size is reduced without changing the number of probe packets included in the packet train and the regular transmission intervals upon the next bandwidth estimation, thus enabling the estimation resolution for each probe packet to increase. This has an advantageous effect of improving the estimation accuracy.

Moreover, for example when using the technique described in PTL 1, in the case where the upper limit of the search range becomes low, the number of probe packets included in the packet train is reduced so as not to transmit probe packets near the end of the packet train upon the next bandwidth estimation. This has an advantageous effect of reducing the communication load required for estimation.

Exemplary Embodiment 2

Figure 6:
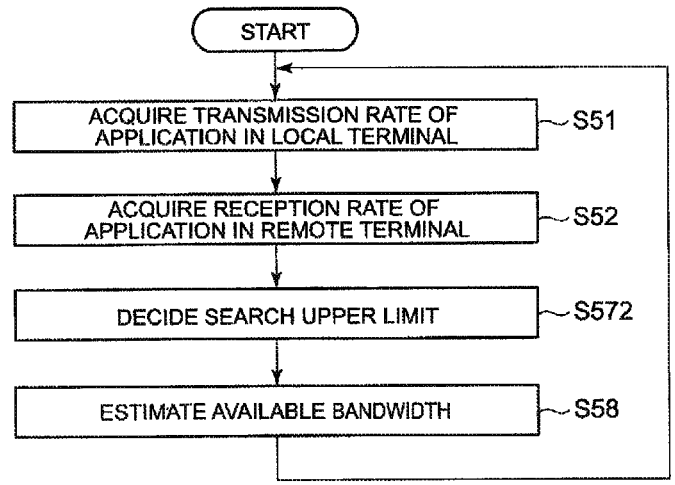
FIG. 6 It is a flowchart depicting an operation in Exemplary Embodiment 2.

The following describes an operation in Exemplary Embodiment 2. FIG. 6 is a flowchart depicting an operation in Exemplary Embodiment 2. In Exemplary Embodiment 2, the upper limit of the search range of the available bandwidth is decided by taking into account not only the transmission rate of the application in the local terminal 1 but also the reception rate of the application in the remote terminal 2.

The local terminal transmission rate acquisition means 10 executes the process of step S51 in the same way as in Exemplary Embodiment 1.

The remote terminal reception rate notification means 23 acquires the communication rate of data being received by the application in the remote terminal 2 from the network interface (step S52). The remote terminal reception rate notification means 23 stores the acquired communication rate in the data storage means 22 as the remote terminal reception rate 42. The remote terminal reception rate notification means 23 notifies the remote terminal reception rate acquisition means 14 of the remote terminal link speed 41 and the remote terminal reception rate 42.

The search range control means 11 compares "(the local terminal link speed 30)−(the local terminal transmission rate 31)" with "(the remote terminal link speed 41)−(the remote terminal reception rate 42)", and sets a smaller one of the values as the upper limit of the search range of the available bandwidth (step S572). The search range control means 11 stores the upper limit in the data storage means 13 as the search upper limit communication rate 33.

Figure 7:
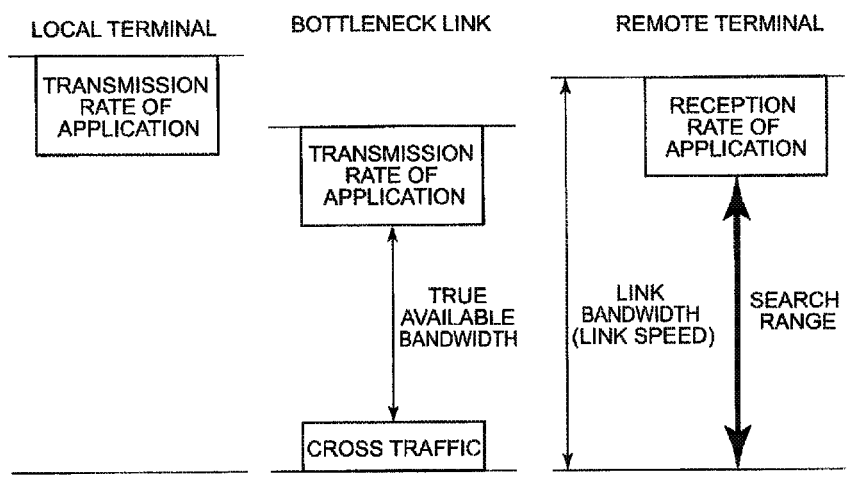
FIG. 7 It is an explanatory diagram depicting a search range computation method.

FIG. 7 is an explanatory diagram depicting a method of computing the search upper limit communication rate 33 (search range). A method of computing the search upper limit communication rate 33 (search range) in the case where "(the local terminal link speed 30)−(the local terminal transmission rate 31)>(the remote terminal link speed 41)−(the remote terminal reception rate 42)" is depicted in FIG. 7. The value of the search upper limit communication rate 33 is "(the remote terminal link speed 41)−(the remote terminal reception rate 42)". In the typical available bandwidth estimation method, the search range matches the link bandwidth. In this exemplary embodiment, on the other hand, the range obtained by subtracting the reception rate of the application from the link bandwidth is the search range. This search range is narrower than the search range in the typical available bandwidth estimation method.

In this exemplary embodiment, too, in the bottleneck link, the true available bandwidth obtained by subtracting the cross traffic and the transmission rate of the application in the local terminal 1 from the physical bandwidth of the bottleneck link is included in the search range. Therefore, in this exemplary embodiment, too, the available bandwidth is correctly estimated while preventing searching for an available bandwidth in an unnecessarily wide range.

After this, the process of step S58 is executed in the same way as in Exemplary Embodiment 1. The operation then returns to step S51.

Exemplary Embodiment 3

Figure 8:
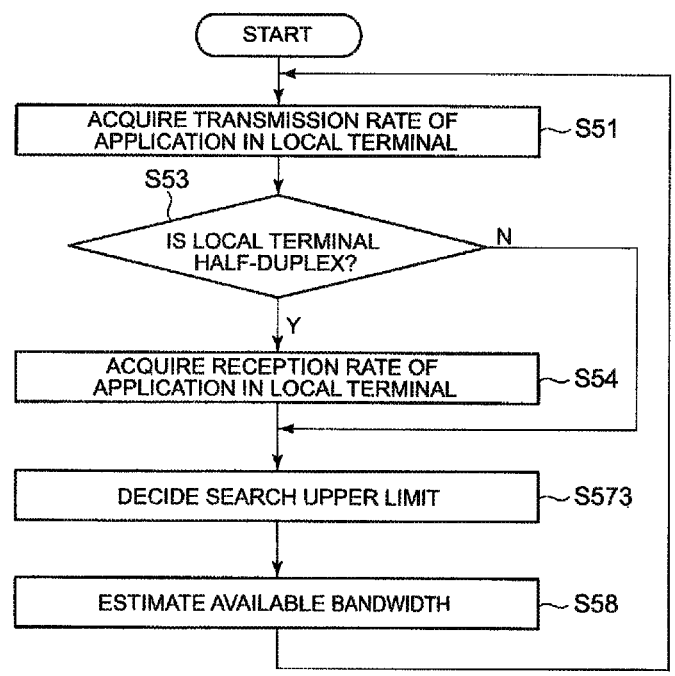
FIG. 8 It is a flowchart depicting an operation in Exemplary Embodiment 3.

The following describes an operation in Exemplary Embodiment 3. FIG. 8 is a flowchart depicting an operation in Exemplary Embodiment 3. In Exemplary Embodiment 3, in the case where the communication in the section of the access line of the local terminal 1 is half-duplex communication, the upper limit of the search range of the available bandwidth is decided by taking into account not only the transmission rate of the application in the local terminal 1 but also the reception rate of the application in the local terminal 1.

The local terminal transmission rate acquisition means 10 executes the process of step S51 in the same way as in Exemplary Embodiment 1.

The full-duplex/half-duplex determination means 15 determines whether the communication in the section of the access line of the local terminal 1 is full-duplex communication or half-duplex communication (step S53). In the case where the communication is half-duplex communication, the operation proceeds to step S54. In the case where the communication is full-duplex communication, the operation proceeds to step S573.

In step S54, the local terminal reception rate acquisition means 16 acquires the communication rate of data being received by the application in the local terminal 1 from the network interface. The local terminal reception rate acquisition means 16 stores the communication rate in the data storage means 13 as the local terminal reception rate 34. The operation then proceeds to step S573.

In step S573, in the case where the communication in the section of the access line of the local terminal 1 is determined as half-duplex communication in the process of step S53, the search range control means 11 computes "(the local terminal link speed 30)−(the local terminal transmission rate 31)−(the local terminal reception rate 34)", and sets the computation result as the upper limit of the search range of the available bandwidth. The search range control means 11 stores the upper limit in the data storage means 13 as the search upper limit communication rate 33.

Figure 9:
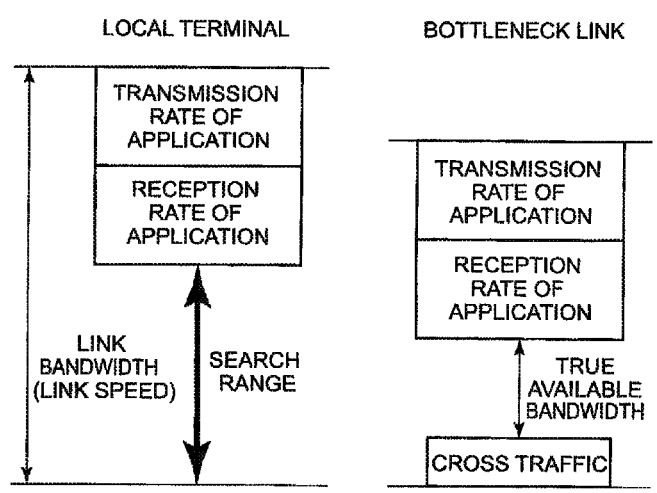
FIG. 9 It is an explanatory diagram depicting a search range computation method.

FIG. 9 is an explanatory diagram depicting a method of computing the search upper limit communication rate 33 (search range). A method of computing the search upper limit communication rate 33 (search range) in the case where the communication in the section of the access line of the local terminal 1 is determined as half-duplex communication is depicted in FIG. 9. In the typical available bandwidth estimation method, the search range matches the link bandwidth. In this exemplary embodiment, on the other hand, the range obtained by subtracting the transmission rate of the application and the reception rate of the application from the link bandwidth is the search range. This search range is narrower than the search range in the typical available bandwidth estimation method.

In this exemplary embodiment, too, in the bottleneck link, the true available bandwidth obtained by subtracting the cross traffic, the transmission rate of the application in the local terminal 1, and the reception rate of the application in the local terminal 1 from the physical bandwidth of the bottleneck link is included in the search range. Therefore, in this exemplary embodiment, too, the available bandwidth is correctly estimated while preventing searching for an available bandwidth in an unnecessarily wide range.

In the case where the communication in the section of the access line of the local terminal 1 is determined as full-duplex communication in the process of step S53, the search range control means 11 computes "(the local terminal link speed 30)−(the local terminal transmission rate 31)", and sets the computation result as the upper limit of the search range of the available bandwidth. The search range control means 11 stores the upper limit in the data storage means 13 as the search upper limit communication rate 33.

After this, the process of step S58 is executed in the same way as in Exemplary Embodiment 1. The operation then returns to step S51.

Exemplary Embodiment 4

The following describes an operation in Exemplary Embodiment 4. FIG. 10 is a flowchart depicting an operation in Exemplary Embodiment 4. In Exemplary Embodiment 4, in the case where the communication in the section of the access line of the remote terminal 2 is half-duplex communication, the upper limit of the search range of the available bandwidth is decided by taking into account not only the reception rate of the application in the remote terminal 2 but also the transmission rate of the application in the remote terminal 2.

The local terminal transmission rate acquisition means 10 executes the process of step S51 in the same way as in Exemplary Embodiments 1 to 3. The remote terminal reception rate notification means 23 executes the process of step S52 in the same way as in Exemplary Embodiments 1 to 3.

The full-duplex/half-duplex determination means 15 executes the process of step S53 in the same way as in Exemplary Embodiment 3. In the case where the communication is half-duplex communication, the local terminal reception rate acquisition means 16 executes the process of step S54 in the same way as in Exemplary Embodiment 3. The operation then proceeds to step S55.

In step S55, the full-duplex/half-duplex determination means 24 determines whether the communication in the section of the access line of the remote terminal 2 is full-duplex communication or half-duplex communication. In the case where the communication is half-duplex communication, the operation proceeds to step S56. In the case where the communication is full-duplex communication, the operation proceeds to step S574.

In step S56, the remote terminal transmission rate notification means 25 acquires the communication rate of data being transmitted by the application in the remote terminal 2 through the network interface. The remote terminal transmission rate notification means 25 stores the acquired communication rate in the data storage means 22 as the remote terminal transmission rate 43. The remote terminal transmission rate notification means 25 notifies the remote terminal transmission rate acquisition means 17 of the communication rate. The operation then proceeds to step S574.

In step S574, in the case where the communication in the section of the access line of the local terminal 1 is determined as half-duplex communication in the process of step S53 and the communication in the section of the access line of the remote terminal 2 is determined as half-duplex communication in the process of step S55, the search range control means 11 compares "(the local terminal link speed 30)–(the local terminal transmission rate 31)–(the local terminal reception rate 34)" with "(the remote terminal link speed 41)–(the remote terminal reception rate 42)–(the remote terminal transmission rate 43)", and sets a smaller one of the values as the upper limit of the search range of the available bandwidth. The search range control means 11 stores the upper limit in the data storage means 13 as the search upper limit communication rate 33.

In the case where the communication in the section of the access line of the local terminal 1 is determined as half-duplex communication in the process of step S53 and the communication in the section of the access line of the remote terminal 2 is determined as full-duplex communication in the process of step S55, the search range control means 11 compares "(the local terminal link speed 30)–(the local terminal transmission rate 31)–(the local terminal reception rate 34)" with "(the remote terminal link speed 41)–(the remote terminal reception rate 42)", and sets a smaller one of the values as the upper limit of the search range of the available bandwidth. The search range control means 11 stores the upper limit in the data storage means 13 as the search upper limit communication rate 33.

In the case where the communication in the section of the access line of the local terminal 1 is determined as full-duplex communication in the process of step S53 and the communication in the section of the access line of the remote terminal 2 is determined as half-duplex communication in the process of step S55, the search range control means 11 compares "(the local terminal link speed 30)–(the local terminal transmission rate 31)" with "(the remote terminal link speed 41)–(the remote terminal reception rate 42)–(the remote terminal transmission rate 43)", and sets a smaller one of the values as the upper limit of the search range of the available bandwidth. The search range control means 11 stores the upper limit in the data storage means 13 as the search upper limit communication rate 33.

In the case where the communication in the section of the access line of the local terminal 1 is determined as full-duplex communication in the process of step S53 and the communication in the section of the access line of the remote terminal 2 is determined as full-duplex communication in the process of step S55, the search range control means 11 compares "(the local terminal link speed 30)–(the local terminal transmission rate 31)" with "(the remote terminal link speed 41)–(the remote terminal reception rate 42)", and sets a smaller one of the values as the upper limit of the search range of the available bandwidth. The search range control means 11 stores the upper limit in the data storage means 13 as the search upper limit communication rate 33.

After this, the process of step S58 is executed in the same way as in Exemplary Embodiments 1 to 3. The operation then returns to step S51.

FIG. 11 is a block diagram depicting a main part of an available bandwidth search range control system according to the present invention. The available bandwidth search range control system depicted in FIG. 11 includes a first terminal 1000 (corresponding to the local terminal 1 depicted in FIG. 2) and a second terminal 2000 (corresponding to the remote terminal 2 depicted in FIG. 2) that are connected to a network 3. The first terminal 1000 includes: a local terminal transmission rate acquisition unit 100 (corresponding to the local terminal transmission rate acquisition means 10 depicted in FIG. 2) for acquiring a transmission rate of an application in the first terminal 1000; a search range control unit 110 (corresponding to the search range control means 11 depicted in FIG. 2) for deciding an upper limit of a search range of an available bandwidth of a communication line, using the transmission rate; and a probe packet transmission unit 120 (corresponding to the probe packet transmission means 12 depicted in FIG. 2) for transmitting a probe packet to the second terminal 2000 in a bandwidth less than or equal to the upper limit. The second terminal 2000 includes: a probe packet receiving unit 200 (corresponding to the probe packet receiving means 20 depicted in FIG. 2) for receiving the probe packet; and an available bandwidth estimation unit 210 (corresponding to the available bandwidth estimation means 21 depicted in FIG. 2) for estimating the available bandwidth based on the received probe packet.

FIG. 12 is a block diagram depicting another example of the available bandwidth search range control system according to the present invention. In the available bandwidth search range control system depicted in FIG. 12, the first terminal 1000 further includes: a remote terminal reception rate acquisition unit 140 (corresponding to the remote terminal reception rate acquisition means 14 depicted in FIG. 2) for acquiring a reception rate of an application in the second terminal 2000 and a link speed of the second terminal 2000; a full-duplex/half-duplex determination unit 150 (corresponding to the full-duplex/half-duplex determination means 15 depicted in FIG. 2) for determining whether communication in a section of an access line of the first terminal 1000 is full-duplex communication or half-duplex communication; a local terminal reception rate acquisition unit 160 (corresponding to the local terminal reception rate acquisition means 16 depicted in FIG. 2) for acquiring a reception rate of the application in the first terminal 1000; and a remote terminal transmission rate acquisition unit 170 (corresponding to the remote terminal transmission rate acquisition means 17 depicted in FIG. 2) for acquiring a transmission rate of the application in the second terminal 2000. The second terminal 2000 further includes: a terminal reception rate notification unit 230 (corresponding to the remote terminal reception rate notification means 23 depicted in FIG. 2) for notifying the first terminal 1000 of the reception rate of the application in the second terminal 2000 and the link speed of the second terminal 2000; a full-duplex/half-duplex determination unit 240 (corresponding to the full-duplex/half-duplex determination means 24 depicted in FIG. 2) for determining whether communication in a section of an access line of the second terminal 2000 is full-duplex communication or half-duplex communication; and a terminal transmission rate notification unit 250 (corresponding to the remote terminal transmission rate notification means 25 depicted in FIG. 2) for notifying the first terminal 1000 of the transmission rate of the application in the second terminal 2000.

As described above, the available bandwidth search range control system includes the local terminal 1 and the remote terminal 2. In the case where the upper limit of the search range of the available bandwidth is not designated by the user, the local terminal 1 computes the difference between the link speed of the local terminal 1 and the communication rate of data being transmitted by the application in the local terminal 1, computes the difference between the link speed of the remote terminal 2 and the communication rate of data being received by the application in the remote terminal 2, and sets a smaller one of the two differences as the upper limit of the search range of the available bandwidth.

In the case where the communication in the section of the access line is half-duplex communication as when any of the local terminal 1 and the remote terminal 2 is connected to the network by a wireless LAN or connected to not a switching hub but a repeater hub, the local terminal 1 subtracts, from the link speed of the terminal performing half-duplex communication, the communication rate of data being transmitted by the application and the communication rate of data being received by the application, and sets the computed difference as the upper limit of the search range of the available bandwidth.

In the case where the maximum transmission rate of video in video communication or the like is predetermined and the upper limit of the search range of the available bandwidth is designated by the user with the maximum transmission rate of video or the like, the local terminal 1 computes the difference between the maximum transmission rate of video and the communication rate of data being transmitted by the application in the local terminal 1, computes the difference between the maximum transmission rate of video and the communication rate of data being received by the application in the remote terminal 2, and sets a smaller one of the two differences as the upper limit of the search range of the available bandwidth.

In each of the exemplary embodiments described above, the search range of the available bandwidth can be controlled according to the transmission rate of the application for video communication or the like. Searching for an available bandwidth in an unnecessarily wide range is therefore prevented.

For example when using the technique described in PTL 1, in the case where the upper limit of the search range becomes low, the amount of increase in packet size is reduced without changing the number of probe packets included in the packet train and the regular transmission intervals upon the next bandwidth estimation, thus enabling the estimation resolution for each probe packet to increase. This improves the estimation accuracy.

Moreover, for example when using the technique described in PTL 1, in the case where the upper limit of the search range becomes low, the number of probe packets included in the packet train is reduced so as not to transmit probe packets near the end of the packet train upon the next bandwidth estimation. This reduces the communication load required for estimation.

The exemplary embodiments described above may be partly or wholly described in the following supplementary notes, though the present invention is not limited to the following structures.

(Supplementary note 1) An available bandwidth search range control system wherein a first terminal 1000 includes: a local terminal transmission rate acquisition unit 100 which acquires a transmission rate of an application in the first terminal 1000; a search range control unit 110 which decides an upper limit of a search range of an available bandwidth of a communication line, using the transmission rate; and a probe packet transmission unit 120 which transmits a probe packet to a second terminal 2000 in a bandwidth less than or equal to the upper limit, wherein the second terminal 2000 includes: a probe packet receiving unit 200 which receives the probe packet; and an available bandwidth estimation unit 210 which estimates the available bandwidth based on the received probe packet, wherein the first terminal 1000 further includes: a local terminal reception rate acquisition unit 160 (see FIG. 12) which acquires a reception rate of the application in the first terminal 1000; and a full-duplex/half-duplex determination unit 150 (see FIG. 12) which determines whether communication in a section of an access line of the first terminal 1000 is full-duplex communication or half-duplex communication, and wherein in the case where the communication in the section of the access line of the first terminal 1000 is determined as half-duplex communication, the search range control unit 110 sets a value obtained by subtracting the transmission rate of the application in the first terminal 1000 and the reception rate of the application in the first terminal 1000 from a link speed of the first terminal 1000, as the upper limit of the search range of the available bandwidth.

(Supplementary note 2) An available bandwidth search range control system wherein a first terminal 1000 includes: a local terminal transmission rate acquisition unit 100 which acquires a transmission rate of an application in the first terminal 1000; a search range control unit 110 which decides an upper limit of a search range of an available bandwidth of a communication line, using the transmission rate; and a probe packet transmission unit 120 which transmits a probe packet to a second terminal 2000 in a bandwidth less than or equal to the upper limit, wherein the second terminal 2000 includes: a probe packet receiving unit 200 which receives the probe packet; and an available bandwidth estimation unit 210 which estimates the available bandwidth based on the received probe packet, wherein the first terminal 1000 further includes: a local terminal reception rate acquisition unit 160 (see FIG. 12) which acquires a reception rate of the application in the first terminal 1000; a full-duplex/half-duplex determination unit 150 (see FIG. 12) which determines whether communication in a section of an access line of the first terminal 1000 is full-duplex communication or half-duplex communication; a remote terminal reception rate acquisition unit 160 (see FIG. 12) which acquires a reception rate of an application in the second terminal 2000 and a link speed of the second terminal 2000; and a remote terminal transmission rate acquisition unit 170 (see FIG. 12) which acquires a transmission rate of the application in the second terminal 2000, wherein the second terminal 2000 further includes a full-duplex/half-duplex determination unit 240 (see FIG. 12) which determines whether communication in a section of an access line of the second terminal 2000 is full-duplex communication or half-duplex communication, and wherein in the case where the communication in the section of the access line of the first terminal 1000 is determined as half-duplex communication and the communication in the section of the access line of the second terminal 2000 is determined as half-duplex communication, the search range control unit 110 compares a value obtained by subtracting the transmission rate of the application in the first terminal 1000 and the reception rate of the application in the first terminal 1000 from a link speed of the first terminal 1000 with a value obtained by subtracting the reception rate of the application in the second terminal 2000 and the transmission rate of the application in the second terminal 2000 from the link speed of the second terminal 2000, and sets a smaller one of the values as the upper limit of the search range of the available bandwidth.

(Supplementary note 3) An available bandwidth search range control system wherein a first terminal 1000 includes: a local terminal transmission rate acquisition unit 100 which acquires a transmission rate of an application in the first terminal 1000; a search range control unit 110 which decides an upper limit of a search range of an available bandwidth of a communication line, using the transmission rate; and a probe packet transmission unit 120 which transmits a probe packet to a second terminal 2000 in a bandwidth less than or equal to the upper limit, wherein the second terminal 2000 includes: a probe packet receiving unit 200 which receives the probe packet; and an available bandwidth estimation unit 210 which estimates the available bandwidth based on the received probe packet, wherein the first terminal 1000 further includes: a local terminal reception rate acquisition unit 160 (see FIG. 12) which acquires a reception rate of the application in the first terminal 1000; a full-duplex/half-duplex determination unit 150 (see FIG. 12) which determines whether communication in a section of an access line of the first terminal 1000 is full-duplex communication or half-duplex communication; and a remote terminal reception rate acquisition unit 140 (see FIG. 12) which acquires a reception rate of an application in the second terminal 2000 and a link speed of the second terminal 2000, wherein the second terminal 2000 further includes a full-duplex/half-duplex determination unit 240 (see FIG. 12) which determines whether communication in a section of an access line of the second terminal 2000 is full-duplex communication or half-duplex communication, and wherein in the case where the communication in the section of the access line of the first terminal 1000 is determined as half-duplex communication and the communication in the section of the access line of the second terminal 2000 is determined as full-duplex communication, the search range control unit 110 compares a value obtained by subtracting the transmission rate of the application in the first terminal 1000 and the reception rate of the application in the first terminal 1000 from a link speed of the first terminal 1000 with a value obtained by subtracting the reception rate of the application in the second terminal 2000 from the link speed of the second terminal 2000, and sets a smaller one of the values as the upper limit of the search range of the available bandwidth.

(Supplementary note 4) An available bandwidth search range control system wherein a first terminal 1000 includes: a local terminal transmission rate acquisition unit 100 which acquires a transmission rate of an application in the first terminal 1000; a search range control unit 110 which decides an upper limit of a search range of an available bandwidth of a communication line, using the transmission rate; and a probe packet transmission unit 120 which transmits a probe packet to a second terminal 2000 in a bandwidth less than or equal to the upper limit, wherein the second terminal 2000 includes: a probe packet receiving unit 200 which receives the probe packet; and an available bandwidth estimation unit 210 which estimates the available bandwidth based on the received probe packet, wherein the first terminal 1000 further includes: a full-duplex/half-duplex determination unit 150 which determines whether communication in a section of an access line of the first terminal 1000 is full-duplex communication or half-duplex communication; a remote terminal reception rate acquisition unit 140 which acquires a reception rate of an application in the first terminal 1000 and a link speed of the second terminal 2000; and a remote terminal transmission rate acquisition unit 170 which acquires a transmission rate of the application in the second terminal 2000, wherein the second terminal 2000 further includes a full-duplex/half-duplex determination unit 240 which determines whether communication in a section of an access line of the second terminal 2000 is full-duplex communication or half-duplex communication, and wherein in the case where the communication in the section of the access line of the first terminal 1000 is determined as full-duplex communication and the communication in the section of the access line of the second terminal 2000 is determined as half-duplex communication, the search range control unit 110 compares a value obtained by subtracting the transmission rate of the application in the first terminal 1000 from a link speed of the first terminal 1000 with a value obtained by subtracting the reception rate of the application in the second terminal 2000 and the transmission rate of the application in the second terminal 2000 from the link speed of the second terminal 2000, and sets a smaller one of the values as the upper limit of the search range of the available bandwidth.

(Supplementary note 5) A terminal including: a local terminal transmission rate acquisition unit 100 (see FIG. 11) which acquires a transmission rate of an application in the local terminal; a search range control unit 110 (see FIG. 11) which decides an upper limit of a search range of an available bandwidth of a communication line, using the transmission rate; and a probe packet transmission unit 120 which transmits a probe packet to a remote terminal (corresponding to the second terminal 2000 depicted in FIG. 11) in a bandwidth less than or equal to the upper limit.

Though the present invention has been described with reference to the above exemplary embodiments and examples, the present invention is not limited to the above exemplary embodiments and examples. Various changes understandable by those skilled in the art can be made to the structures and details of the present invention within the scope of the present invention.

This application claims priority based on Japanese Patent Application No. 2012-13200 filed on Jan. 25, 2012, the disclosure of which is incorporated herein in its entirety.

INDUSTRIAL APPLICABILITY

The present invention is utilized for preventing searching for an available bandwidth in an unnecessarily wide range in the case where an application has a high transmission rate.

REFERENCE SIGNS LIST

1 local terminal
2 remote terminal
3 network
10 local terminal transmission rate acquisition means
11 search range control means
12 probe packet transmission means
13 data storage means
14 remote terminal reception rate acquisition means
15 full-duplex/half-duplex determination means
16 local terminal reception rate acquisition means
17 remote terminal transmission rate acquisition means
20 probe packet receiving means
21 available bandwidth estimation means 22 data storage means
23 remote terminal reception rate notification means
24 full-duplex/half-duplex determination means
25 remote terminal transmission rate notification means
100 local terminal transmission rate acquisition unit
110 search range control unit
120 probe packet transmission unit
140 remote terminal reception rate acquisition unit
150 full-duplex/half-duplex determination unit
160 local terminal reception rate acquisition unit
170 remote terminal transmission rate acquisition unit
200 probe packet receiving unit
210 available bandwidth estimation unit
230 terminal reception rate notification unit
240 full-duplex/half-duplex determination unit
250 terminal transmission rate notification unit
1000 first terminal
2000 second terminal

The invention claimed is:

1. An available bandwidth search range control method comprising:
  acquiring a transmission rate of an application in a local terminal;
  deciding an upper limit of a search range of an available bandwidth of a communication line, using the transmission rate; and
  estimating the available bandwidth in the search range less than or equal to the upper limit;
  the method further comprises:
  acquiring a reception rate of the application in the local terminal;
  determining whether communication in a section of an access line of the local terminal is full-duplex communication or half-duplex communication; and
  setting, in the case where the communication in the section of the access line of the local terminal is determined as half-duplex communication, a value obtained by subtracting the transmission rate of the application in the local terminal and the reception rate of the application in the local terminal from a link speed of the local terminal, as the upper limit of the search range of the available bandwidth.

2. An available bandwidth search range control system comprising a first terminal and a second terminal that are connected to a network,
  wherein the first terminal comprises:
  a local terminal transmission rate acquisition unit which acquires a transmission rate of an application in the first terminal;
  a search range control unit which decides an upper limit of a search range of an available bandwidth of a communication line, using the transmission rate; and
  a probe packet transmission unit which transmits a probe packet to the second terminal in a bandwidth less than or equal to the upper limit, and
  wherein the second terminal comprises:
  a probe packet receiving unit which receives the probe packet; and
  an available bandwidth estimation unit which estimates the available bandwidth based on the received probe packet;
  wherein the first terminal further comprises:
  a local terminal reception rate acquisition unit which acquires a reception rate of the application and a link speed in the first terminate; and
  a full-duplex/half-duplex determination unit which determines whether communication in a section of an access line of the first terminal is full-duplex communication or half-duplex communication, and
  wherein in the case where the communication in the section of the access line of the first terminal is determined as half-duplex communication, the search range control unit sets a value obtained by subtracting the transmission rate of the application in the first terminal and the reception rate of the application in the first terminal form a link speed of the first terminal, as the upper limit of the search range of the available bandwidth.

* * * * *